(12) United States Patent
Rauch et al.

(10) Patent No.: US 10,012,094 B2
(45) Date of Patent: Jul. 3, 2018

(54) CARRIER RING

(71) Applicant: Ansaldo Energia Switzerland AG, Baden (CH)

(72) Inventors: Marc Rauch, Regensdorf (CH); Felix Hoenig, Fislisbach (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 627 days.

(21) Appl. No.: 14/493,429

(22) Filed: Sep. 23, 2014

(65) Prior Publication Data

US 2015/0082807 A1 Mar. 26, 2015

Related U.S. Application Data

(63) Continuation of application No. PCT/EP2013/056168, filed on Mar. 22, 2013.

(30) Foreign Application Priority Data

Mar. 26, 2012 (EP) .................................... 12161155

(51) Int. Cl.
*F01D 5/22* (2006.01)
*F01D 9/04* (2006.01)
(Continued)

(52) U.S. Cl.
CPC .................. *F01D 5/22* (2013.01); *F01D 9/04* (2013.01); *F01D 9/041* (2013.01); *F01D 9/042* (2013.01);
(Continued)

(58) Field of Classification Search
CPC .......... F01D 9/04; F01D 9/041; F01D 9/0942; F01D 25/243; F01D 25/246; F01D 25/28;
(Continued)

(56) References Cited

U.S. PATENT DOCUMENTS 4,050,702 A * 9/1977 Del Matto ............... F16J 9/063
277/483
5,454,220 A 10/1995 Althaus et al.
(Continued)

FOREIGN PATENT DOCUMENTS

CN 1420258 A 5/2003
DE 195 13 517 A1 10/1996
(Continued)

OTHER PUBLICATIONS

EP 2196628 A1 English Translation.*
(Continued)

*Primary Examiner* — Phutthiwat Wongwian
*Assistant Examiner* — Jessica Kebea
(74) *Attorney, Agent, or Firm* — Buchanan Ingersoll & Rooney PC

(57) ABSTRACT

The invention relates to a carrier ring for a high-pressure gas turbine of a gas turbine plant, which has a high-pressure combustion chamber upstream of the high-pressure gas turbine, a compressor upstream of the high-pressure combustion chamber, a low-pressure combustion chamber downstream of the high-pressure gas turbine, a low-pressure gas turbine downstream of the low-pressure combustion chamber, and a rotor that carries rotor blades for the compressor, for the high-pressure gas turbine, and for the low-pressure gas turbine. The carrier ring carries guide blades and/or heat shields of the high-pressure gas turbine and can be fastened to the high-pressure combustion chamber. The installation of the carrier ring can be simplified by segmenting the carrier ring at least in the area of the guide blades thereof and/or of the heat shields thereof in the circumferential direction, wherein the segmented carrier ring has at least two ring segments that carry the guide blades and/or the heat shields.

7 Claims, 2 Drawing Sheets

(51) Int. Cl.
*F01D 25/24* (2006.01)
*F02C 3/045* (2006.01)
*F02C 7/24* (2006.01)

(52) U.S. Cl.
CPC ............ *F01D 25/246* (2013.01); *F02C 3/045* (2013.01); *F02C 7/24* (2013.01); *F05D 2240/11* (2013.01); *F05D 2240/15* (2013.01)

(58) Field of Classification Search
CPC .... F01D 5/22; F02C 3/045; F02C 7/20; F02C 7/24; F05D 2240/11; F05D 2240/15; F05D 2240/91; F05D 2260/30; F23R 3/60; F23R 2900/00017
See application file for complete search history.

(56) References Cited

U.S. PATENT DOCUMENTS

| | | | |
|---|---|---|---|
| 5,577,378 A | 11/1996 | Althaus et al. | |
| 7,850,425 B2 | 12/2010 | Snook et al. | |
| 8,240,043 B2 * | 8/2012 | Duesler | F01D 11/001 29/412 |
| 8,500,394 B2 * | 8/2013 | Major | F01D 17/162 415/160 |
| 8,708,648 B2 * | 4/2014 | Kupper | F01D 9/042 415/209.2 |
| 8,790,067 B2 * | 7/2014 | McCaffrey | F01D 11/18 415/1 |
| 8,951,010 B2 * | 2/2015 | Major | F01D 17/162 415/209.4 |
| 9,238,976 B2 * | 1/2016 | Ahmad | F01D 9/023 |
| 9,447,696 B2 * | 9/2016 | McCaffrey | F01D 11/18 |
| 9,523,311 B2 | 12/2016 | Carroni et al. | |
| 2003/0113204 A1 * | 6/2003 | Wolf | F01D 17/162 415/165 |
| 2009/0038311 A1 | 2/2009 | Snook et al. | |
| 2010/0146984 A1 | 6/2010 | Carroni et al. | |
| 2011/0085894 A1 * | 4/2011 | Dueckershoff | F01D 9/041 415/175 |
| 2017/0002674 A1 * | 1/2017 | Vetters | F01D 25/246 |

FOREIGN PATENT DOCUMENTS

| | | | |
|---|---|---|---|
| DE | 199 50 108 A1 | 4/2001 | |
| DE | 10 2007 031 828 A1 | 1/2009 | |
| EP | 0 620 362 B1 | 10/1994 | |
| EP | 0620363 A1 | 10/1994 | |
| EP | 2 149 678 A1 | 2/2010 | |
| EP | 2 196 628 A1 | 6/2010 | |
| EP | 2196628 A1 * | 6/2010 | ............. C22C 37/04 |
| EP | 2 261 467 A2 | 12/2010 | |
| GB | 1109457 A * | 4/1968 | ............. F01D 9/041 |
| GB | 2 161 108 A | 1/1986 | |
| JP | H06-323160 A | 11/1994 | |
| JP | 2009-041568 A | 2/2009 | |
| JP | 2010-535303 A | 11/2010 | |
| WO | 2010/040339 A1 | 4/2010 | |
| WO | 2010/099781 A2 | 9/2010 | |

OTHER PUBLICATIONS

Office Action (Notification of Reasons for Refusal) dated Jan. 10, 2017, by the Japanese Patent Office in corresponding Japanese Patent Application No. 2015-502253, and an English Translation of the Office Action. (13 pages).

* cited by examiner

CARRIER RING

CROSS-REFERENCE TO RELATED APPLICATIONS

This application claims priority to PCT/EP2013/056168 filed Mar. 22, 2013, which claims priority to European application 12161155.2 filed Mar. 26, 2012, both of which are hereby incorporated in their entireties.

TECHNICAL FIELD

The present invention relates to a carrier ring for a high-pressure gas turbine of a gas turbine installation. The invention also relates to a gas turbine installation equipped with such a carrier ring, in particular for driving a generator for generating electricity in a power plant installation.

BACKGROUND

A sequential gas turbine installation, as emerges for example from EP 0 620 362 B1, has a high-pressure gas turbine which is acted upon by the hot gases of a high-pressure combustion chamber arranged upstream. Upstream of this high-pressure combustion chamber, a compressor ensures the provision of the compressor air. Downstream of the high-pressure gas turbine, a low-pressure combustion chamber is provided. The hot gases of this low-pressure combustion chamber act on a low-pressure gas turbine arranged downstream. Such a gas turbine installation is preferably operated using a common rotor which carries the rotor blades of the compressor, of the high-pressure gas turbine and of the low-pressure gas turbine.

Such a gas turbine installation uses a carrier ring of the type mentioned in the introduction in the region of the high-pressure gas turbine, in order to carry guide vanes and/or heat shields of the high-pressure gas turbine, or to position these in the gas path. In that context, the carrier ring can carry guide vanes of the high-pressure gas turbine which are operatively connected to the rotor blades of the high-pressure gas turbine. In addition, the carrier ring can also carry heat shields between guide vanes which are adjacent in the circumferential direction. Alternatively, the carrier ring can also be used to carry heat shields which are radially adjacent to rotor blades of the high-pressure gas turbine and lie in the same axial plane.

Within the context of mounting such a gas turbine, it is in principle possible to push the preassembled carrier ring axially onto the rotor, which is already fitted with the guide vanes for the compressor and the two gas turbines. In the correct axial position, the carrier ring can, for further assembly, be secured to the rotor with the aid of retaining elements as mounting aid. The rotor, together with the carrier ring, may then be placed in a stator casing in the gas turbine installation. Furthermore, the carrier ring may then be attached to the stator casing.

The retaining elements, which have permitted the carrier ring to be secured to the rotor for assembly, are then removed again. Such a procedure is relatively onerous. Furthermore, the axial length of the rotor blading of the compressor and/or of the low-pressure gas turbine is limited by the free diameter of the carrier ring in order that the carrier ring might be pushed onto the bladed rotor. Finally, maintenance work for exchanging the guide vanes and/or the heat shields of the carrier ring proves to be most onerous as the entire rotor must be removed from the stator casing in order to be able to take off the carrier ring again. In such a gas turbine installation, the carrier ring is often also termed the High-Pressure Turbine (HPT) ring.

DE 199 50 108 A1 discloses a heat-shield ring which is arranged in a gas turbine, radially adjacent to rotor blades of the gas turbine. The disclosed heat-shield ring comprises a plurality of heat-shield segments which are arranged one behind the other in the circumferential direction and which are held with the aid of clamping segments attached to the stator casing. The clamping segments are arranged axially on the stator casing on either side of the heat-shield segments and each have, on their inner sides facing one another in the axial direction, a groove which extends in the circumferential direction and in which the heat-shield segments engage axially on the peripheral side.

WO 2010/040339 A1 discloses a rotor blade ring for a rotor of a gas turbine, consisting of a multiplicity of circumferentially adjacent rotor blades. A circumferentially segmented assembly ring is provided for assembling the rotor blade ring, where suitable connecting pieces are provided in order to connect circumferentially adjacent ring segments. The use of such a segmented mounting aid simplifies the introduction of a prestress in the guide vane ring.

SUMMARY

The present invention tackles the problem of proposing, for a carrier ring of the type mentioned in the introduction or for a gas turbine installation equipped with such a carrier ring, an improved or at least another embodiment by means of which assembly of the gas turbine installation and/or maintenance of the gas turbine installation can be simplified.

The present invention solves this problem in particular with the features of the independent claim. Advantageous embodiments according to the object form the subject matter of the dependent claims.

The invention is based on the general consideration of circumferentially segmenting the carrier ring at least in the region of its guide vanes and/or in the region of its heat shields such that at least two ring segments, each carrying guide vanes and/or heat shields, are present. By virtue of the segmentation of the carrier ring, it is no longer necessary to push the carrier ring axially onto the rotor. Rather, it is possible to assemble the individual ring segments interdependently, at the axial position provided for the carrier ring with respect to the rotor, to give the carrier ring.

The onerous and complex process of threading the carrier ring onto the rotor, with its rotor blades, is thus no longer necessary. Moreover, the dimensions of the rotor blades of the rotor are no longer dependent on the free inner diameter of the carrier ring. It is thus possible for the outer diameter of a first rotor blade row of the compressor and/or a last rotor blade row of the low-pressure gas turbine, in particular, to be larger than the free inner diameter of the carrier ring.

Moreover, maintenance of the gas turbine installation in the region of the carrier ring, for example in order to exchange or inspect the guide vanes and/or the heat shields of the carrier ring, is simplified.

In order to remove the carrier ring, it is possible to re-segment the latter without it being necessary to remove the entire rotor from the stator casing. The circumferential direction of the carrier ring relates, when the carrier ring is in the installed state, to the axis of rotation of the rotor of the gas turbine installation.

According to a particularly advantageous embodiment, the carrier ring may also be divided axially and have a circumferentially segmented main partial ring, which carries the guide vanes and/or the heat shields, and at least one circumferentially segmented side partial ring. Preference is given in this respect to a variant in which only the main partial ring is equipped with the guide vanes and/or with the heat-shields, such that the respective side partial ring carries neither guide vanes nor heat shields. It is in particular possible to stabilize the main partial ring with the aid of the respective side partial ring. The segments of the side partial ring may preferably be used to connect the segments of the main partial ring to one another. When the carrier ring is in the installed state, the axial direction extends parallel to the axis of rotation of the rotor of the gas turbine installation.

In another advantageous embodiment, the carrier ring may have exactly two segmented side partial rings which are arranged on either side of the main partial ring. The main partial ring may thereby be particularly efficiently smoothed.

Preference is given in this respect to a development in which the two side partial rings are identical. The configuration of the side partial rings as identical parts reduces manufacturing costs. In addition, it is thus possible to avoid mix-ups during assembly.

The main partial ring segments may be designed as identical parts. In addition or as an alternative, the side partial ring segments may be designed as identical parts.

Of particular advantage is an embodiment in which the ring segments of the main partial ring are offset in the circumferential direction with respect to the ring segments of the respective side partial ring. The main partial ring segments and the side partial ring segments thus overlap in the circumferential direction, whereby the constructed carrier ring has greater stability. Preference is given in this respect to a development in which the ring segments of the main partial ring are offset in the circumferential direction, with respect to the ring segments of the respective side partial ring, by approximately 50% of their circumferential length. In this manner, approximately half of every side partial ring segment is assigned to each of two adjacent main partial ring segments.

In another advantageous embodiment, an axial wall thickness of the main partial ring may be at least 50% greater than an axial wall thickness of the respective side partial ring. In this manner, the main partial ring can be better used for its carrying function with respect to the guide vanes and/or the heat shields. At the same time, the reduced axial wall thickness of the respective side partial ring leads to the construction of the constructed carrier ring presented here being compact in the axial direction.

Of particular advantage is an embodiment in which the respective side partial ring has exactly four ring segments. An embodiment in which the main partial ring has exactly four ring segments is also preferred. In that context, it is expedient for the arc length of the individual ring segments, in the circumferential direction, to be substantially the same. In the case of four ring segments, the respective individual ring segment therefore extends over approximately 90°. It has been found that such 90° ring segments are relatively simple to handle and that, in the assembled state, they ensure the desired stability for the carrier ring.

It is clear that, in principle, another division of the main partial ring and/or of the respective side partial ring is also conceivable. For example, these may also be divided into exactly two or exactly three or exactly five ring segments. Preference is given to an embodiment in which the main partial ring is divided in the same manner as the respective side partial ring. In principle, however, another or a different division of the main partial ring and of the side partial ring is also conceivable.

Of particular advantage is an embodiment in which the main partial ring is screwed to the respective side partial ring. Such screwed connections permit efficient, high-strength and detachable connections between the main partial ring and the respective side partial ring. Preference is given in this respect to a development in which the respective screwed connection extends axially. In this manner, the main partial ring and the respective side partial ring are clamped together in the axial direction, whereby the desired stiffness in the assembled carrier ring can be produced. Where two side partial rings are provided, on either side of the main partial ring, the respective screwed connection extends through the main partial ring. Where screwed connections are established, a screw head can bear axially against one side partial ring. A threaded opening for the respective screw may be provided on the other side partial ring. It is also possible for the respective screw to bear on the other side partial ring by means of a nut, where appropriate with a washer.

A gas turbine installation according to the invention thus comprises a compressor, a high-pressure combustion chamber arranged downstream of the compressor, a high-pressure gas turbine arranged downstream of the high-pressure combustion chamber, a low-pressure combustion chamber arranged downstream of the high-pressure gas turbine and a low-pressure gas turbine arranged downstream of the low-pressure combustion chamber. The gas turbine installation according to the invention is characterized by a carrier ring of the type described above which is attached to the high-pressure combustion chamber and which carries guide vanes and/or heat shields for the high-pressure gas turbine.

In principle, the use of the carrier ring according to the invention is not limited just to sequentially operated gas turbine installations, also termed gas turbo groups; rather, other gas turbo concepts, consisting for example of a compressor, a combustion chamber and a turbine, are also possible and can benefit from the advantages of the described carrier ring according to the invention.

The focus, predominantly adopted here, on sequentially fired gas turbine installations has the sole purpose of particularly obviously disclosing the problems advantageously solved by using the carrier ring according to the invention.

Further important features and advantages of the invention emerge from the subclaims, from the drawings and from the associated description of the figures with reference to the drawings.

It is to be understood that the features mentioned above, and those to be enumerated below, can be used not only in the combination indicated in each case but also in other combinations or alone without departing from the scope of the present invention.

BRIEF DESCRIPTION OF THE DRAWINGS

Preferred exemplary embodiments of the invention are represented in the drawings and will be explained in more detail in the following description, wherein identical reference signs relate to identical or similar or functionally identical components. All features which are not essential for the direct understanding of the invention have been omitted.

In the figures, in each case schematically.

DETAILED DESCRIPTION

Figure 1:
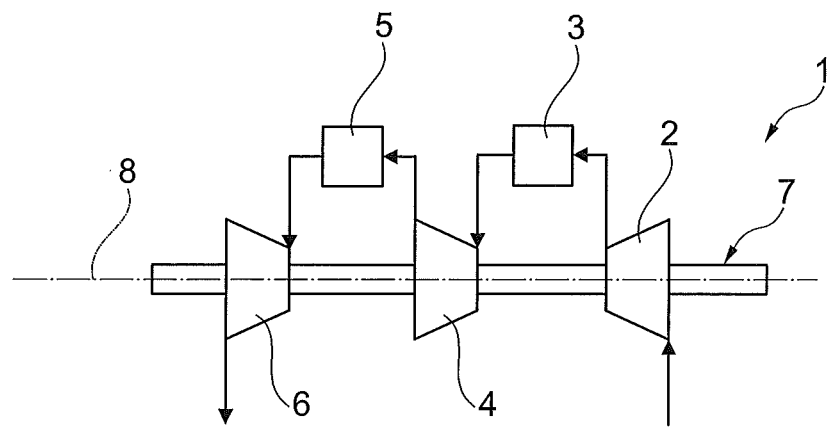
FIG. 1 shows a greatly simplified diagrammatic representation, in the form of a circuit diagram, of a gas turbine installation.

As shown in FIG. 1, a gas turbine installation 1, which can preferably be used for driving a generator (not shown here) for generating electricity in a power plant installation, comprises a compressor 2, a high-pressure combustion chamber 3 arranged downstream of the compressor 2, a high-pressure gas turbine 4 arranged downstream of the high-pressure combustion chamber 3, a low-pressure combustion chamber 5 arranged downstream of the high-pressure gas turbine 4 and a low-pressure gas turbine 6 arranged downstream of the low-pressure combustion chamber 5. The working gas is guided through the gas turbine installation 1 as shown by arrows in FIG. 1. Expediently, the gas turbine installation 1 has, for the compressor 2 and the two gas turbines 4, 6, a common rotor 7 which rotates about an axis of rotation 8 when the gas turbine installation 1 is in operation.

Figure 2:
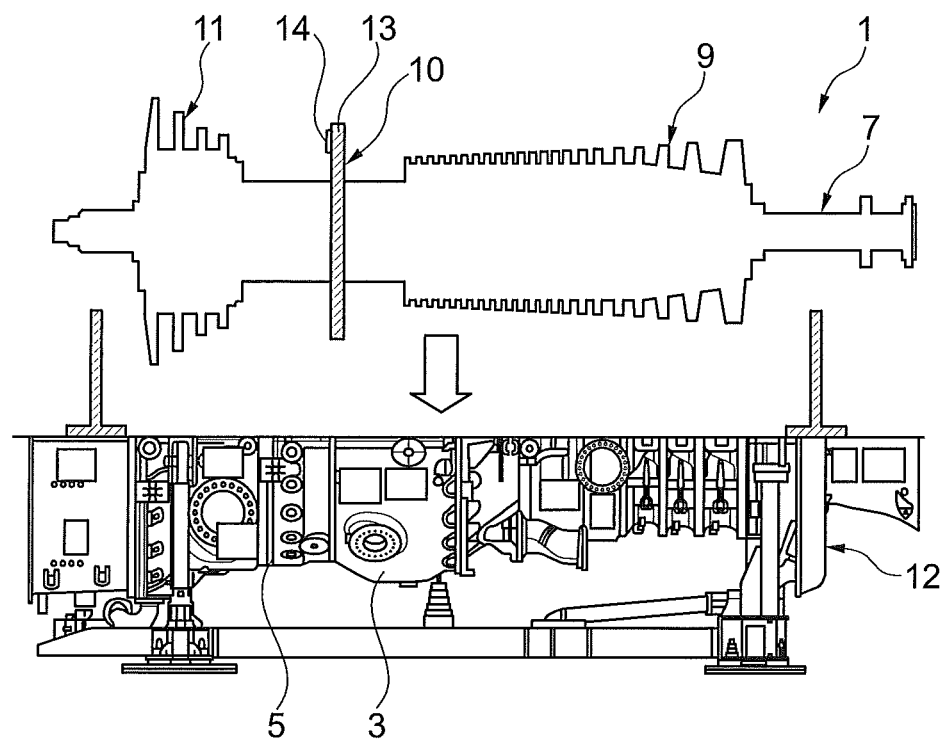
FIG. 2 shows a simplified side view of the gas turbine installation when mounting a rotor in a stator casing.

As shown in FIG. 2, the rotor 7 carries a rotor blading 9 of the compressor 2 which, in the example, extends parallel to the axis of rotation 8 and consists of a plurality of rotor blade rows 9 which succeed one another in the axial direction. A plurality of individual rotor blades 9 are arranged in the circumferential direction, with respect to the axis of rotation 8, within the respective rotor blade row 9. The rotor 7 also carries a rotor blading 10 of the high-pressure gas turbine 4, which has at least one rotor blade row 10 which comprises a plurality of circumferentially adjacent individual rotor blades 10. Finally, the rotor 7 also carries a rotor blading 11 of the low-pressure gas turbine 6 which, in the example, comprises a plurality of rotor blade rows 11 which are arranged axially adjacent to one another and each comprise circumferentially adjacent individual rotor blades 11.

As shown in FIG. 2, the gas turbine installation 1 also comprises a stator casing 12, of which only a lower half is shown in FIG. 2 and which serves for receiving and bearing the rotor 7. A downward-pointing arrow indicates the lowering of the rotor 7 into the stator casing 12 during assembly. The high-pressure combustion chamber 3 and the low-pressure combustion chamber 5 are also formed on the casing 12.

The gas turbine installation 1 is further equipped with a carrier ring 13 which is arranged on the stator side and is assigned to the high-pressure gas turbine 4. In the example of FIG. 2, the carrier ring 13 is already positioned on the rotor 7, specifically, in the region of the rotor blading 10 of the high-pressure gas turbine 4. The fixing of the position between the carrier ring 13 and the rotor 7, which is only necessary for mounting the rotor 7 in the stator casing 12, is brought about in the example of FIG. 2 with the aid of a mounting aid 14. In the final mounted state, the carrier ring 13 is then mounted, that is to say attached, to the stator casing 12, preferably to the high-pressure combustion chamber 3. The mounting aid 14 can then be removed again.

Figure 3:
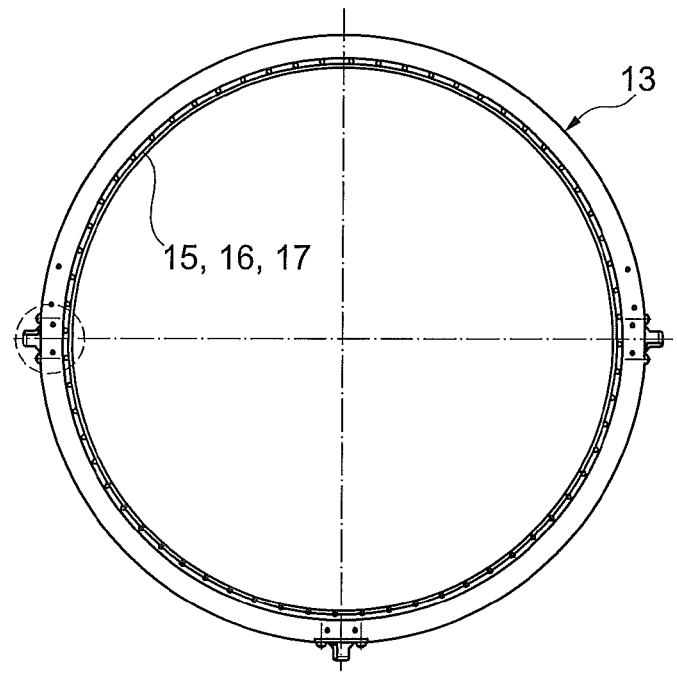
FIG. 3 shows an axial view of a carrier ring.

The carrier ring 13 will be explained in more detail below, with reference to FIGS. 3 and 4. The carrier ring 13 carries, on its inner circumference, stator-side components 15 of the high-pressure gas turbine 4. These may be guide vanes 16 or heat shields 17. The components 15 may also be both guide vanes 16 and heat shields 17.

Figure 4:
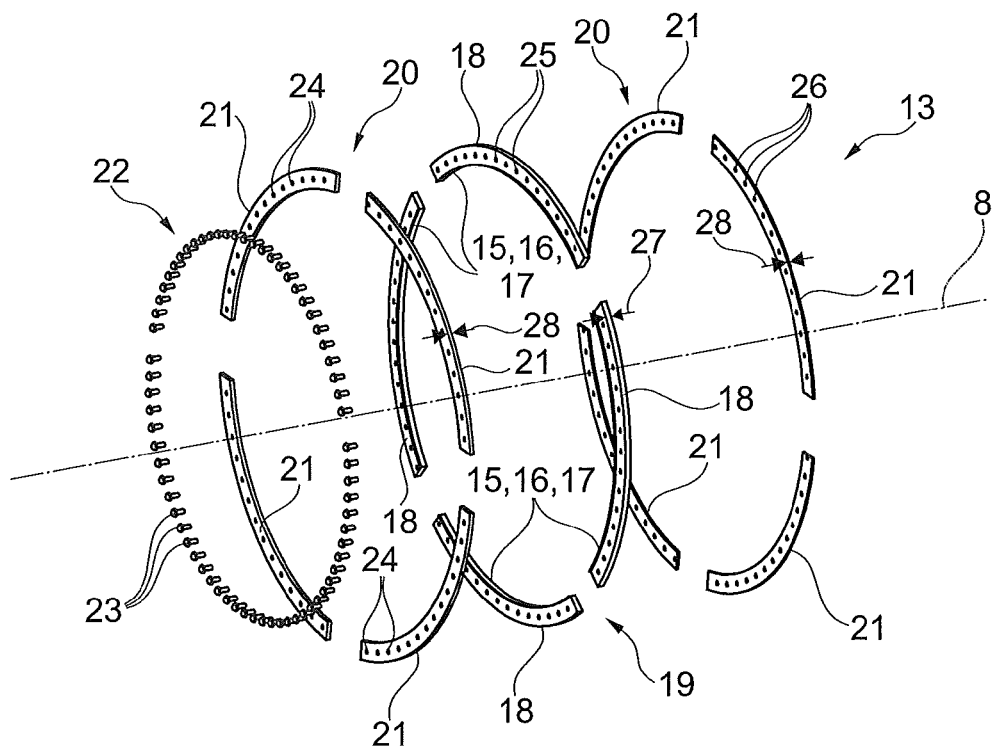
FIG. 4 shows an exploded isometric representation of the carrier ring.

As shown in FIG. 4, the carrier ring 13 is segmented circumferentially, at least in the region of the guide vanes 16 and/or heat shields 17, such that it has at least two ring segments 18 which carry the guide vanes 16 and/or heat shields 17. In the example, exactly four such ring segments are provided. Furthermore, the carrier ring 13 in the preferred example of FIG. 4 is also divided in the axial direction, such that it has one main partial ring 19 which is segmented circumferentially and at least one side partial ring 20 which is also segmented circumferentially. The main partial ring 19 carries the guide vanes 16 and/or heat shields 17 and thereby comprises the abovementioned segments 18 which in the following are also termed main partial ring segments 18. In the example of FIG. 4, two side partial rings 20 are provided, whose segments are labeled 21 in the following. The side partial rings 20 serve to attach the main partial ring segments 18 to one another so as to form, in the assembled state, the carrier ring 13 which is stable in itself. The side partial rings 20 therefore carry neither guide vanes 16 nor heat shields 17. The two side partial rings 20 are arranged on either side of the main partial ring 19 as seen in the axial direction which, when the carrier ring 13 is in the installed state, coincides with the axis of rotation 8 of the rotor 7. In the example shown, each of the side partial rings 20 also has exactly four side partial ring segments 21. The segmentation of the main partial ring 19 and the segmentation of the side partial rings 20 is in this case symmetric, such that the individual segments 18, 21 each extend over approximately 90° in the circumferential direction.

As shown in FIG. 4, the ring segments 18 of the main partial ring 19 are arranged offset in the circumferential direction with respect to the ring segments 21 of the two side partial rings 20, preferably by approximately 50% of their respective circumferential length. In other words, the 90° main partial ring segments 18 are arranged offset by approximately 45° in the circumferential direction with respect to the 90° side partial ring segments 21. The side partial rings 20 and/or their segments 21 bear axially directly against the main partial ring 19 and/or the segments 18 thereof. Reference sign 22 indicates a screwed connection which comprises a multiplicity of individual screws 23 which are each oriented axially and are arranged next to one another in the circumferential direction. The individual screws 23 pass through one side partial ring 20 in corresponding through openings 24, and through the main partial ring 19 in corresponding through openings 25. The other side partial ring 20 also has a corresponding number of openings 26. Depending on the configuration of the screwed connection 22, the openings 26 of the other side partial ring 20 form threaded openings 26 into which the screws 23 are screwed, or also through openings 26 through which the screws 23 pass, it being then possible to screw the screws 23 to an outer side of the other side partial ring 20, facing away from the main partial ring 19, by means of appropriate nuts (not shown here).

Expediently, however, the two side partial rings 20 are of identical configuration. The 90° segmentation of the partial rings 19, 20 allows the corresponding ring segments 18, 21 also to be of respectively identical design. Preferably, therefore, the main partial ring segments 18 are identical parts. In addition or alternatively, the side partial ring segments 21 are also identical parts.

In the example shown in FIG. 4, the main partial ring 19 and/or the corresponding segments 18 has/have in each case an axial wall thickness 27 which is greater than an axial wall thickness 28 of the two side partial rings 20 and/or of the corresponding segments 21. Preferably, the wall thickness 27 of the main partial ring 19 is at least 50% greater than the axial wall thickness 28 of the respective side partial ring 20.

In particular, the main partial ring 29 may be twice as big, with respect to its wall thickness 27, as the side partial rings 20.

The segmented carrier ring 13 presented here may also, in a departure from the representation in FIG. 2, be installed subsequently in the stator casing 12, around the rotor 7, that is to say in the case of a rotor 7 already placed in the stator casing 12. Equally, the carrier ring 13 may be removed without this requiring the rotor 7 to be removed from the stator casing 12.

The invention claimed is:

1. A carrier ring for a gas turbine installation, which gas turbine installation includes at least one compressor, at least one combustion chamber operated downstream of the at least one compressor and at least one turbine located downstream of the at least one combustion chamber arranged to be acted upon by hot gases from the at least one combustion chamber, wherein rotor blades of the at least one compressor and of the at least one turbine are arranged on a common rotor shaft, said carrier ring comprising:
   a main ring configured to carry guide vanes and/or heat shields to be attached via the carrier ring to the at least one turbine, the main ring being segmented circumferentially into main ring segments having joints at least in a region configured to carry the guide vanes and/or the heat shields;
   at least two ring segments of the main ring configured to carry the guide vanes and/or the heat shields; and
   at least two side partial rings, each of the at least two side partial rings being circumferentially segmented into side partial ring segments having joints; each of the at least two side partial rings being positioned on opposite sides of the main ring, the at least two side partial rings being arranged to attach at least two ring segments of the main ring to one another,
   each joint of the at least two ring segments of the main ring are offset in the circumferential direction with respect to each joint of the side partial ring segments of the at least two side partial rings;
   wherein the at least two side partial rings are identical in size and shape.

2. The carrier ring as claimed in claim 1, in combination with a gas turbine installation which comprises:
   a compressor unit having the at least one compressor;
   a first combustion chamber operating downstream of the compressor unit as one of the at least one combustion chamber;
   a first turbine operating downstream of the first combustion chamber as one of the at least one turbine;
   a second combustion chamber operating downstream of the first turbine as another of the at least one combustion chamber;
   a second turbine operating downstream of the second combustion chamber as another of the at least one turbine; and
   wherein the carrier ring carries the guide vanes and/or the heat shields for at least the first turbine and is attached at least to the first combustion chamber.

3. The carrier ring as claimed in claim 1, wherein an axial wall thickness of the main ring is at least 50% greater than an axial wall thickness of each of the at least two side partial rings.

4. The carrier ring as claimed in claim 1, wherein each of the at least two side partial rings has exactly four ring segments and/or each of the at least two side partial rings is symmetrically segmented.

5. The carrier ring as claimed in claim 1, wherein the main ring has exactly four main ring segments wherein each joint of the four main ring segments are offset in the circumferential direction with respect to each joint of the side partial ring segments.

6. The carrier ring as claimed in claim 1, wherein the main partial ring is screwed to each of the at least two side partial rings.

7. A gas turbine installation with a carrier ring as claimed in claim 1 for driving a generator for generating electricity in a power plant installation, the gas turbine installation comprising:
   the at least one compressor;
   a first combustion chamber as one of the at least one combustion chamber arranged downstream of the compressor;
   a first turbine as one of the at least one turbine arranged downstream of the first combustion chamber;
   a second combustion chamber as another of the at least one combustion chamber arranged downstream of the first turbine; and
   a second turbine as another of the at least one turbine arranged downstream of the second combustion chamber, wherein at least the first turbine has the carrier ring as claimed in claim 1 which is attached at least to the first combustion chamber.

* * * * *